(12) United States Patent
Hooker

(10) Patent No.: US 7,263,585 B2
(45) Date of Patent: Aug. 28, 2007

(54) STORE-INDUCED INSTRUCTION COHERENCY MECHANISM

(75) Inventor: Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 437 days.

(21) Appl. No.: 10/665,171

(22) Filed: Sep. 19, 2003

(65) Prior Publication Data

US 2004/0068618 A1  Apr. 8, 2004

Related U.S. Application Data

(60) Provisional application No. 60/412,111, filed on Sep. 19, 2002.

(51) Int. Cl.
  *G06F 12/12*  (2006.01)
(52) U.S. Cl. .............. 711/140; 711/119; 711/125; 711/141; 711/205; 711/207
(58) Field of Classification Search ........ 711/140–141, 711/119, 125, 205, 207
  See application file for complete search history.

(56) References Cited

U.S. PATENT DOCUMENTS

| | | | |
|---|---|---|---|
| 5,742,791 A | | 4/1998 | Mahalingaiah et al. |
| 5,835,949 A | * | 11/1998 | Quattromani et al. ....... 711/135 |
| 5,930,821 A | * | 7/1999 | Gaskins et al. ............. 711/146 |
| 6,073,217 A | | 6/2000 | Mahalingaiah et al. |
| 6,164,840 A | * | 12/2000 | Lynch ......................... 712/207 |
| 6,389,512 B1 | | 5/2002 | Mahalingaiah et al. |
| 6,405,307 B1 | * | 6/2002 | Murty et al. ................ 712/239 |
| 6,594,734 B1 | | 7/2003 | Kyker et al. |
| 6,668,309 B2 | * | 12/2003 | Bachand et al. ............ 711/146 |
| 6,848,032 B2 | * | 1/2005 | Benkual et al. ............. 711/146 |
| 2004/0015675 A1 | * | 1/2004 | Kyker et al. ................ 711/207 |

* cited by examiner

*Primary Examiner*—Pierre Bataille
*Assistant Examiner*—Hetul Patel
(74) *Attorney, Agent, or Firm*—Richard K. Huffman; James W. Huffman

(57) ABSTRACT

An apparatus and method for ensuring coherency of instructions within stages of the pipeline microprocessor. The apparatus includes instruction cache management logic and synchronization logic. The instruction cache management logic receives an address corresponding to a next instruction to be fetched, and detects that a part of a memory page corresponding to the next instruction cannot be freely accessed without checking for coherency of the instructions within the part of the memory page and, upon detection, provides the address. The synchronization logic receives the address from the instruction cache management logic. The synchronization logic directs data cache management logic to check for coherency of the instructions within the part of the memory page, and, if the instructions are not coherent within the part of the memory page, the synchronization logic directs the pipeline microprocessor to stall a fetch of the next instruction until the stages of the pipeline.

19 Claims, 7 Drawing Sheets

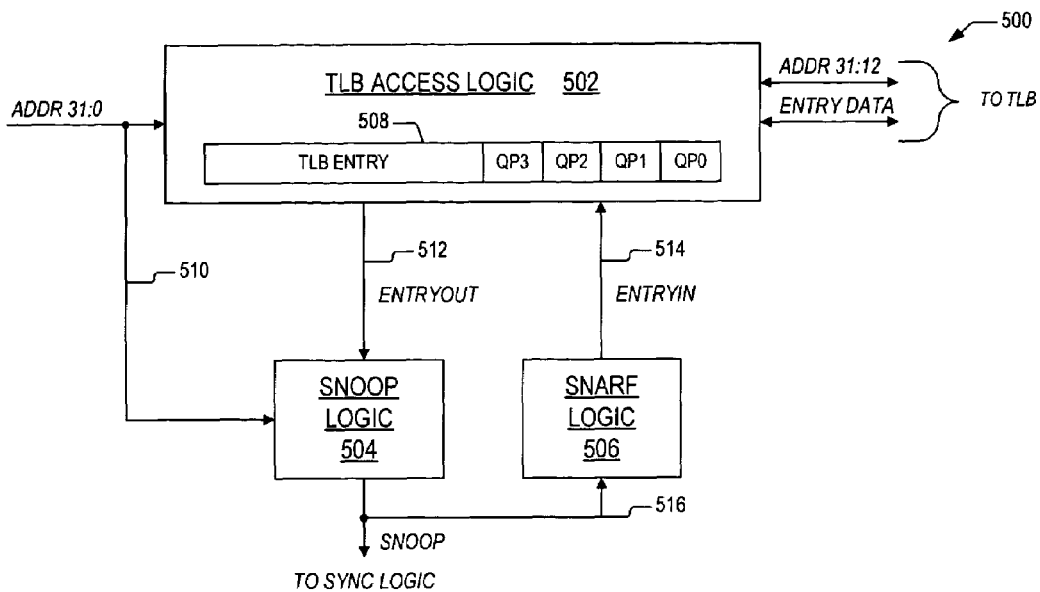

FIG. 5

| DTLB HIT ? | OWN QTR PAGE ? | SYNCRO ACTION |
|---|---|---|
| YES | YES | COMPLETE STORE. |
| YES | NO | I SNOOP. ON SNOOP HIT WITH OWNERSHIP, KILL OWNERSHIP, FLUSH PIPELINE, AND COMPLETE STORE. OTHERWISE, COMPLETE STORE. |
| NO | DON'T CARE | I SNOOP. ON SNOOP HIT, COPY ENTRY FROM ITLB. IF ITLB HAS OWNERSHIP, KILL OWNERSHIP, FLUSH PIPELINE, AND COMPLETE STORE. OTHERWISE, COMPLETE STORE. |

FIG. 6

| ITLB HIT ? | OWN QTR PAGE ? | SYNCRO ACTION |
|---|---|---|
| YES | YES | COMPLETE FETCH. |
| YES | NO | D SNOOP. ON SNOOP HIT WITH OWNERSHIP, STALL UNTIL PIPELINE IS IDLE, KILL OWNERSHIP, COMPLETE FETCH. OTHERWISE, COMPLETE FETCH. |
| NO | DON'T CARE | D SNOOP. ON SNOOP HIT, COPY ENTRY FROM DTLB. IF DTLB HAS OWNERSHIP, STALL UNTIL PIPELINE IS IDLE, KILL OWNERSHIP, COMPLETE FETCH. OTHERWISE, COMPLETE FETCH. |

FIG. 7

| DTLB HIT? | OWN QTR PAGE? | DIRTY? | SYNCRO ACTION |
|---|---|---|---|
| YES | YES | YES | COMPLETE STORE. |
| YES | YES | NO | I SNOOP. ON SNOOP HIT WITH OWNERSHIP, KILL OWNERSHIP, FLUSH PIPELINE, AND COMPLETE STORE. OTHERWISE, COMPLETE STORE. |
| YES | NO | X | I SNOOP. ON SNOOP HIT WITH OWNERSHIP, KILL OWNERSHIP, FLUSH PIPELINE, AND COMPLETE STORE. OTHERWISE, COMPLETE STORE. |
| NO | DON'T CARE | NO | I SNOOP. ON SNOOP HIT, COPY ENTRY FROM ITLB. IF ITLB HAS OWNERSHIP, KILL OWNERSHIP, FLUSH PIPELINE, AND COMPLETE STORE. OTHERWISE, COMPLETE STORE. |

*FIG. 9*

| ITLB HIT? | OWN QTR PAGE? | SYNCRO ACTION |
|---|---|---|
| YES | YES | COMPLETE FETCH. |
| YES | NO | D SNOOP. ON SNOOP HIT WITH DIRTY, KILL OWNERSHIP, STALL UNTIL PIPELINE IS IDLE, THEN COMPLETE FETCH. OTHERWISE, COMPLETE FETCH. |
| NO | DON'T CARE | D SNOOP. ON SNOOP HIT, COPY ENTRY FROM DTLB. IF DTLB ENTRY IS DIRTY, KILL OWNERSHIP, STALL UNTIL PIPELINE IS IDLE, THEN COMPLETE FETCH. OTHERWISE, COMPLETE FETCH. |

*FIG. 10*

STORE-INDUCED INSTRUCTION COHERENCY MECHANISM

CROSS-REFERENCE TO RELATED APPLICATIONS

This application claims the benefit of U.S. Provisional Application No. 60/412,111, filed on Sep. 19, 2002, which is herein incorporated by reference for all intents and purposes.

BACKGROUND OF THE INVENTION

1. Field of the Invention

This invention relates in general to the field of microelectronics, and more particularly to a technique applied in a pipeline microprocessor to ensure the coherency of instructions in its pipeline stages.

2. Description of the Related Art

Early microprocessors were designed to execute only one program instruction at a time. Accordingly, an early microprocessor would fetch a first program instruction from program memory and the execute it. Following execution of the first instruction, the early microprocessor would fetch a second program instruction from memory and execute it. Then, a third program instruction would be fetched and executed. And so on. Because only one instruction was being executed at a particular point in time, there was no reasonable basis for prohibiting application programmers from designing programs that contained self-modifying code sections.

In its simplest form, self-modifying code is code that modifies itself. In the example above, self-modifying code would exist if, say, the result of the first program instruction were stored by the early microprocessor to the location in memory from which the third program instruction was to be fetched. Self-modifying code was employed during the days of early microprocessors for several reasons: to save memory space, to implement subroutine calls and returns, to hide instructions running in an application in order to preclude piracy (or to surreptitiously invoke a virus), to interface to particular hardware devices, or to improve overall performance. Self-modifying code techniques were not recommended for use then, nor are they recommended now because code of this sort is often times difficult to understand and maintain.

The disadvantages notwithstanding, self-modifying code it still employed today for many of the reasons stated above. But whereas early microprocessors were not adversely impacted by a requirement to support the execution of self-modifying code, today's microprocessors suffer tremendous impact in terms of the extra logic that must be provided in order to ensure the proper execution of program instructions in the presence of self-modifying code sections. This is because today's microprocessors no longer execute program instructions one-at-a-time; they operate on several instructions at the same time. Multiple instructions are simultaneously being operated upon within successive segments (i.e., "pipeline stages") of a present day microprocessor. Hennessy and Patterson define pipelining as, "an implementation technique whereby multiple instructions are overlapped in execution." *Computer Architecture: A Quantitative Approach*, second edition, by John L. Hennessy and David A. Patterson, Morgan Kaufmann Publishers, San Francisco, Calif., 1996. The authors go on to provide the following excellent illustration of pipelining: "A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe. Instructions enter at one end, progress through the stages, and exit at the other end, just as cars would in an assembly line."

Thus, in a present day microprocessor, instructions are fetched into one end of the pipeline, and they proceed through successive pipeline stages until they complete execution. And very much like an assembly line, a present day pipeline microprocessor is running at peak efficiency when every one of its pipeline stages is operating on a different program instruction. To stall fetching of instructions or execution of instructions while waiting for some pipeline stage to complete an operation decreases the efficiency (i.e., the throughput) of the pipeline. Yet, stalling the pipeline is often required to support many different types of operations in a present day microprocessor. For example, read and write operations to memory are notoriously slow operations that frequently require stalling the pipeline. Conditional changes in program flow (i.e., conditional branch operations) commonly result in pipeline stalls. And the presence of self-modifying code within a pipeline is yet another instance that requires the flow of instructions within a present day microprocessor pipeline to be interrupted.

Consider the example above where the result of the first program instruction is stored to the memory location corresponding to the third program instruction. If the third program instruction has already been fetched from memory and is being operated upon in an upper pipeline stage at the time when the store operation directed by the first program instruction occurs, then it follows that the third program instruction that is currently being operated upon in the upper pipeline stage is not what was intended by the application programmer. This is because the instruction intended for execution by the application programmer had not yet been stored to memory at the time when the third program instruction's memory location was accessed to fetch the third program instruction. This example illustrates a case of instruction incoherency in a pipeline due to the presence of self-modifying code, which all present day microprocessors must address. Yet, a present day microprocessor has no indication of whether it is executing self-modifying code or not. Thus, extensive logic must be provided to check the coherency of every instruction in the pipeline against every store operation that is pending or that is performed while those instructions are present in the pipeline.

Therefore, what is needed is an apparatus in a pipeline microprocessor for checking the coherency of instructions within its pipeline that is simpler and that requires less logic to implement that which has heretofore been provided.

SUMMARY OF THE INVENTION

The present invention, among other applications, is directed to solving the above-noted problems and addresses other problems, disadvantages, and limitations of the prior art. The present invention provides a superior technique for ensuring the coherency of instructions in a present day microprocessor pipeline in the presence of conditions induced by pending or concurrently executed store operations. In one embodiment, an apparatus in a pipeline microprocessor is provided, for ensuring coherency of instructions within stages of the pipeline microprocessor. The apparatus includes instruction cache management logic and synchronization logic. The instruction cache management logic receives an address corresponding to a next instruction to be fetched, and detects that a part of a memory page corresponding to the next instruction to be fetched cannot be freely accessed without checking for coherency of the instructions within the part of the memory page and, upon detection, provides the address. The instruction cache management logic evaluates an instruction translation lookaside buffer (ITLB) entry corresponding to the address to detect that the part cannot be freely accessed. The synchronization logic receives the address from the instruction cache management logic. The synchronization logic directs data cache management logic to check for coherency of the instructions within the part of the memory page, and, if the instructions are not coherent within the part of the memory page, the synchronization logic directs the pipeline microprocessor to stall a fetch of the next instruction to be fetched until the stages of the pipeline microprocessor have executed all preceding instructions. The data cache management logic evaluates a data translation lookaside buffer (DTLB) entry corresponding to the address to detect that the instructions are not coherent within the part of the memory page. If the instruction cache management logic detects that the part cannot be freely accessed, regardless of whether the instructions are coherent or not, the DTLB entry contents are copied into the ITLB entry by the synchronization logic so that an address translation lookup sequence is avoided.

Another aspect of the present invention comprehends a method in a pipeline microprocessor, for ensuring coherency of instructions within stages of the pipeline microprocessor. The method includes, within an instruction cache, detecting that a part of a memory page corresponding to a next instruction to be fetched cannot be freely accessed without checking for coherency of the instructions within the part of the memory page; directing logic within a data cache to check for coherency of the instructions within the part of the memory page; if the instructions are not coherent, stalling a fetch of the next instruction from the instruction cache until the stages of the pipeline microprocessor have executed all preceding instructions; and regardless of whether said instructions are coherent or not, if the part cannot be freely accessed, copying the DTLB entry contents into the ITLB entry, whereby an address translation lookup sequence is avoided. The detecting includes evaluating an instruction translation lookaside buffer (ITLB) entry corresponding to an address for the next instruction. The directing includes evaluating a data translation lookaside buffer (DTLB) entry corresponding to the address for the next instruction.

BRIEF DESCRIPTION OF THE DRAWINGS

These and other objects, features, and advantages of the present invention will become better understood with regard to the following description, and accompanying drawings where:

FIG. 5 is a block diagram illustrating cache management logic according to the present invention;

FIG. 6 is a table detailing synchronization actions that are performed responsive to a pending store operation according to the present invention to ensure the coherency of instructions within a pipeline;

FIG. 7 is a table showing synchronization actions that are performed prior to fetching a next instruction according to the present invention to ensure the coherency of instructions within a pipeline;

FIG. 9 is a table detailing synchronization actions that are performed responsive to a pending store operation according to the alternative embodiment of FIG. 8 to ensure the coherency of instructions within a pipeline; and FIG. 10 is a table showing synchronization actions that are performed prior to fetching a next instruction according to the alternative embodiment of FIG. 8 to ensure the coherency of instructions within a pipeline.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on instruction pipelining and associated techniques employed within present day microprocessors to ensure the coherency of instructions within pipeline stages therein in the presence of self-modifying code, related art examples will now be discussed with reference to FIGS. 1-2. These examples more particularly point out and describe the limitations and disadvantages of the prior art techniques that are employed to ensure store-induced instruction coherency in a present day pipeline microprocessor. Following this, the present invention will be discussed with reference to FIGS. 3-10. The discussion of the present invention will point out aspects, features, and advantages of the present invention that supersede the prior art techniques for ensuring instruction coherency in a present day pipeline microprocessor. The present invention accomplishes the required function of ensuring instruction coherency, yet it requires less real-estate and power to implement than that required to implement the techniques presently available to designers.

Figure 1:
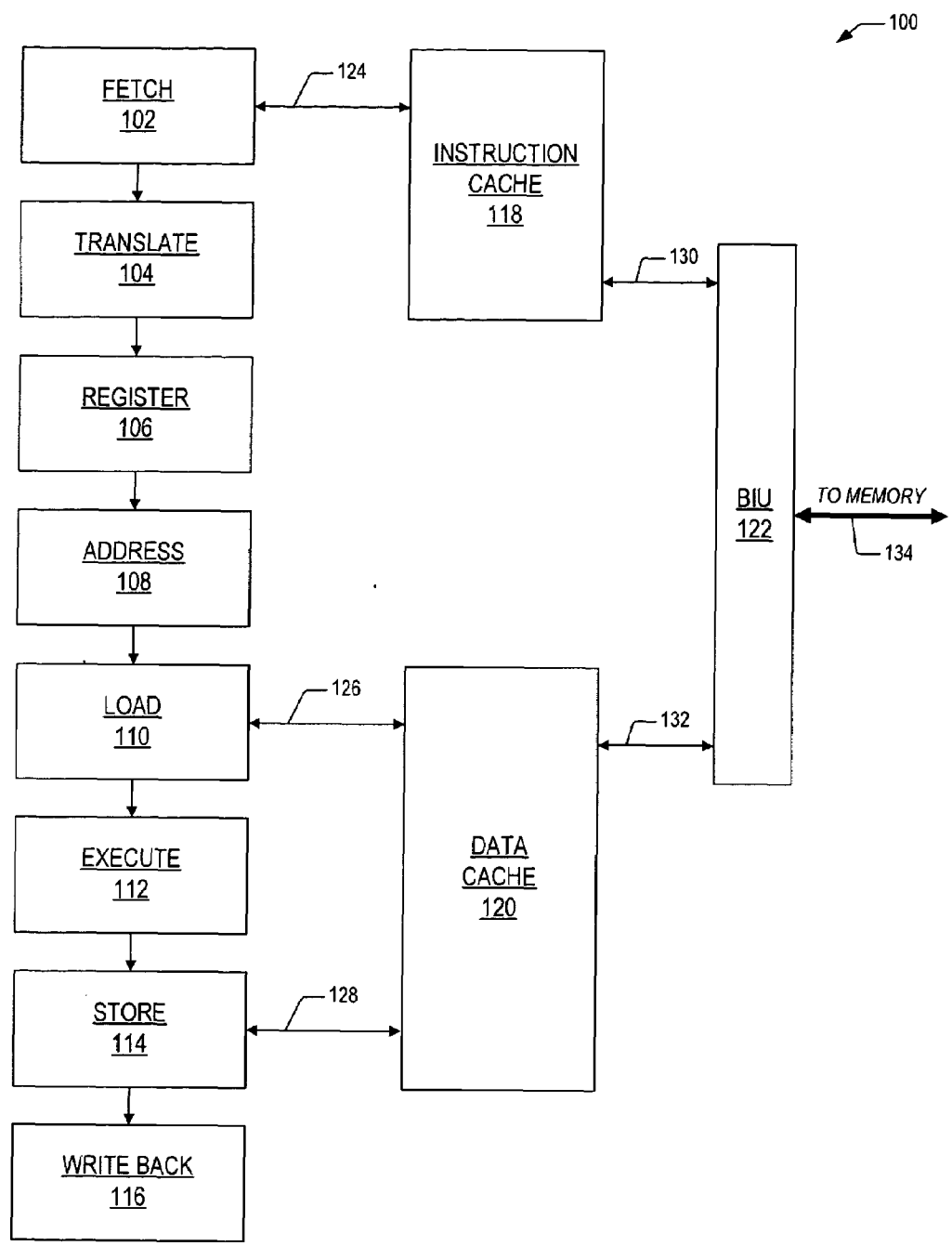
FIG. 1 is a prior art block diagram illustrating exemplary stages within a present day pipeline microprocessor.

Referring to FIG. 1, a prior art block diagram is provided illustrating exemplary stages within a present day pipeline microprocessor 100. The microprocessor 100 has fetch stage logic 102 that is coupled to translate stage logic 104. The translate stage logic 104 is coupled to register stage logic 106. The register stage logic 106 is coupled to address stage logic 108. The address stage logic 108 is coupled to load stage logic 110. The load stage logic 110 is coupled to execute stage logic 112. The execute stage logic 112 is coupled to store stage logic 114. The store stage logic 114 is coupled to write back stage logic 116. The microprocessor 100 also has an instruction cache 118 that is coupled to the fetch stage logic 102 via a fetch bus 124. In addition, the microprocessor 100 has a data cache 120 that is coupled to the load stage logic 110 via a load bus 126 and that is coupled to the store stage logic 114 via a store bus 128. The instruction cache 118 and the data cache 120 are coupled to a bus interface unit 122 via buses 130 and 132, respectively. The bus interface unit 122 interfaces to system memory (not shown) via a memory bus 134.

In operation, the fetch stage logic 102 fetches macro instructions from system memory for execution by the microprocessor 100. The instruction cache 118 is a very fast on-chip memory and its functions are to anticipate which areas of memory are going to be accessed for instruction fetches and to preemptively cache those areas therein so that the fetch stage logic 102 can rapidly access them in the instruction cache 118 rather than having to access them via the bus interface unit 122 over the memory bus 134. If an area of memory corresponding to a next instruction pointer is resident and valid within the instruction cache 118, then it is said that the next instruction pointer experiences a cache "hit." A cache "miss" occurs when the area of memory is not resident within the cache 118 and the memory bus 334 must be employed to fetch a next instruction. Fetched macro instructions are provided to the translate state logic 104 which translates the macro instructions into associated sequences of micro instructions (also known as native instructions) for execution by subsequent stages 106, 108, 110, 112, 114, 116 of the microprocessor 100. Each micro instruction within a given associated sequence of micro instructions directs logic within subsequent pipeline stages 106, 108, 110, 112, 114, 116 to perform sub-operations that are required to accomplish an architectural operation that is prescribed by a corresponding fetched macro instruction. Translated micro instructions are provided to the register stage logic 106. Operands that will be employed in sub-operations in subsequent stages 108, 110, 112, 114, 116 are accessed from registers (not shown) within the register stage logic 106. The address stage logic 108 employs operands provided via the register stage 106 or via a provided micro instruction to generate virtual addresses of memory locations from which operands needed for particular sub-operations will be retrieved or to which the results of particular sub-operations will be stored. The generated addresses for data retrieval sub-operations are provided to the load stage logic 110, which retrieves operands from memory via the data cache 120. Like the instruction cache 118, the data cache 120 is a very fast on-chip memory whose functions are to anticipate which areas of system memory are going to be accessed and to preemptively cache those areas therein so that the load stage logic 110 can rapidly access operands via the data cache 120 rather than having to access them via the bus interface unit 122 over the memory bus 134. Similarly, if an area of memory corresponding to an operand load address is resident and valid within the data cache 120, a data cache "hit" is declared. A data cache "miss" occurs when the area of memory is not resident within the cache 120.

The execution stage logic 112 executes the sub-operations prescribed by micro instructions using provided operands (if required) as passed down from preceding pipeline stages 102, 104, 106, 108, 110. Results of the sub-operations performed by the execution stage logic 112 are provided to the store stage logic 114 if those results are to be written to system memory. The store stage logic 114 performs the sub-operations that are required to store results to memory locations. The store stage logic 114 is also coupled to the data cache 120 and optimally executes store operations to cached locations within the data cache 120 as opposed to having to write result data through to the memory bus 134. Execution results that are designated for storage in architectural registers are provided to the write back stage logic 116. The write back stage logic 116 writes the results into the architectural registers. Hence, macro instructions are fetched from memory and are translated into associated micro instructions. The associated micro instructions are sequentially routed through each of the subsequent logic stages 106, 108, 110, 112, 114, 116 in synchronization with a pipeline clock signal (not shown) so that specified sub-operations can be concurrently executed in a manner substantially similar to operations performed on an assembly line.

The block diagram of FIG. 1 is provided to teach necessary elements of a present day microprocessor 100 that are required for comprehension of the present invention and thus, much of the logic within a present day microprocessor 100 has been omitted from the block diagram for clarity purposes. One skilled in the art will appreciate, however, that a present day microprocessor 100 comprises many stages and logic elements according to specific implementation, some of which have been aggregated herein for clarity purposes. For instance, the load logic 110 could embody a cache interface stage followed by a cache line alignment stage. Furthermore, one skilled in the art will appreciate that a present day microprocessor 100 may embody multiple parallel execution units within the execute stage logic 112 such as an integer unit, a floating point unit, and single instruction-multiple data unit.

In the context of understanding the requirements for addressing instruction coherency within the pipeline stages 102, 104, 106, 108, 110, 112, 114, 116 of a present day microprocessor 100, the present inventors note that there are two cases under which instruction coherency must be checked: 1) at the time when the fetch stage logic 102 goes to the instruction cache 118 to fetch a next instruction and 2) when a store operation is posted by the store logic 114 to the data cache 120. Under the first case, a micro instruction that directs a store operation to a location in memory associated with the next instruction has been posted to the data cache 120 by the store stage logic 114, but the data cache 120 has not yet propagated the modified location back out to memory via the memory bus 134. In this case, if the fetch stage logic 102 were to retrieve the next instruction either from the instruction cache 118 or from memory via the bus interface unit 122, the next instruction would not be correct due to the latency of the data cache 120 in posting stores to memory. Under the second case, an instruction may have already been fetched and provided to any pipeline stage 102, 104, 106, 108, 110, 112 preceding the store stage 114 when a store micro instruction therein directs a store operation to the memory location from which the instruction was previously fetched. In this case as well, the fetched instruction proceeding through the pipeline would otherwise be incorrect if coherency were not managed.

For the first case, if logic within a microprocessor detects that a pending store is associated with a next instruction that is about to be fetched, it is conventional to delay fetching of the next instruction (i.e., to stall the fetch stage logic 102) until all other instructions have propagated through the subsequent pipeline stages and have completed execution. A "pipeline idle" indication or signal (not shown) is generally employed to indicate that the pipeline in the microprocessor 100 is empty and all pending stores have been posted to memory. At this point, it is safe to fetch the next instruction because the store operation that modified the next instruction has been completed. For the second case, when logic within the microprocessor detects that an instruction associated with a pending store instruction's target address (also called a destination address) is already in the pipeline, it is typical to flush instructions from all stages of the pipeline up to and including the stage containing the instruction associated with the target location, to stall fetching until the pipeline is idle, and then to begin fetching instructions again from the location associated with the target address of the store.

Store-induced instruction incoherencies resulting from self-modifying code require a significant amount of logic (and a corresponding amount of area on an integrated circuit die) to detect and manage as has hereinabove been described. And the amount of logic that is required is proportional to the number of stages that exist in a microprocessor's pipeline. To further illustrate these points, an instruction coherency detection and management scheme common to most present day microprocessor's will now be discussed with reference to FIG. 2.

Figure 2:
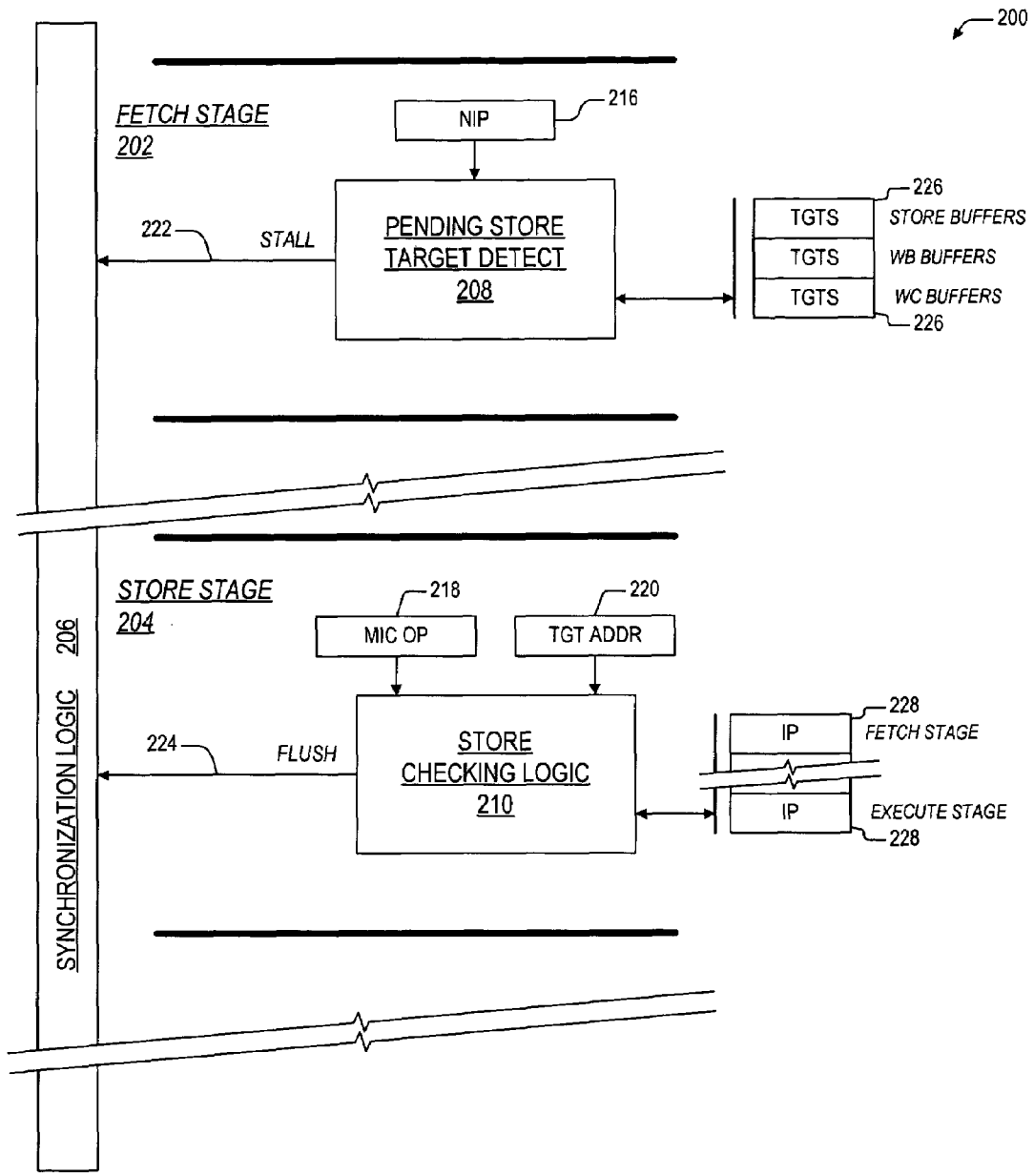
FIG. 2 is a block diagram depicting a present day technique for detecting the presence of instruction incoherencies within a microprocessor pipeline due to pending or concurrently executed store operations.

Turning to FIG. 2, a block diagram 200 is presented depicting a present day technique for detecting the presence of instruction incoherencies within a microprocessor pipeline like that of FIG. 1 due to pending or concurrently executed store operations. The block diagram 200 shows fetch stage logic 202 that has a next instruction pointer register 216 coupled to pending store target detect logic 208. The pending store target detect logic 208 accesses a number of store target registers 226 that are equal in number to the number of pending store operations that the microprocessor is able to process. For example, depending upon the memory model that is architecturally employed, a present day microprocessor will process several store operations to write back memory (WB buffers), several store operations to write combining memory (WC buffers), and several store operations to some other type of memory (STORE buffers). It is beyond the scope of the present application to provide a detailed discussion of the different types of memory models and their corresponding memory attributes that are employed in today's microprocessing systems, however, it is sufficient to point out that a present day microprocessor is capable of buffering a finite number of store operations before it is required to begin posting these operations to cache/memory, and that to ensure coherency of instruction within a pipeline it is necessary to examine the target addresses associated with all pending store operations to determine if an address of a next instruction to be fetched is the same as a target address contained within one of the target registers 226. The block diagram 200 also depicts store stage logic 204 that includes store checking logic 210 coupled to a micro operation register 218 and a target address register 220. The store checking logic is also coupled to a number of instruction pointer registers 228 equal to the number of pipeline stages above the store stage 204.

Operationally, the pending store target detect logic 208 is employed to detect the presence of pending store operations to a target address in memory which is the same as the location from which a next instruction is to be fetched. Accordingly, the virtual address of the next instruction to be fetched is retrieved from the next instruction pointer register 216 and is compared to the virtual addresses contained in all of the store target buffers 226, whose contents reflect all pending or concurrently executing store operations for the microprocessor. If a store target is detected that has the same virtual address as contents of the next instruction pointer 216, then the pending store target detect logic 208 asserts a stall signal 222 to pipeline synchronization logic 206. Responsive to assertion of the stall signal 222, the synchronization logic 206 stalls fetching of the next instruction until all activity in the pipeline has been completed (i.e., the pipeline is idle). When the pipeline is idle, then the synchronization logic allows the next instruction to be fetched.

As micro instructions are provided to the store stage 204, the store checking logic 210 retrieves contents of the micro operation register 218 to detect a store micro instruction and of the target address register 220 to access the store micro instruction's virtual target address. The instruction pointer registers 228 contain the virtual addresses of corresponding program instructions that are being operated upon by all stages of the microprocessor which are above the store stage 204. When the store checking logic 210 detects that contents of an instruction pointer register 228 are the same as contents of the target address register 220, then it is indicated that an incorrect program instruction is presently being operated upon in the pipeline. Accordingly, the store checking logic 210 signals this event to the synchronization logic 206 via bus flush 224 and, depending upon specific implementation, the contents of bus flush 224 may also indicate which pipeline stage the incorrect instructions is in. In turn, the synchronization logic 206 directs the microprocessor to flush all preceding stages of the pipeline (or, only those stages up through the stage associated with the incorrect instruction), and to begin fetching instructions again when the pipeline is idle.

The present inventors have observed that a significant amount of logic is required to maintain and evaluate the contents of both the store target buffers 226 and the instruction pointer buffers 228. Contents of these buffers 226, 228 must be modified and evaluated during virtually every cycle of the pipeline clock. In addition, as one skilled in the art will appreciate, the number of instruction pointer registers 228 that are required to be maintained and evaluated is directly proportional to the number of pipeline stages in a microprocessor. One skilled will furthermore appreciate that increasing the number of pipeline stages in a microprocessor pipeline is perhaps the most effective and prevalently employed technique for increasing the throughput of a pipeline in today's microprocessors. Finally, the present inventors have noted that the logic shown in the block diagram 200 serves no purpose in a pipeline microprocessor other than that associated with detecting and managing store-induced instruction incoherencies. It is therefore very desirable to reduce the amount of dedicated logic that is employed to detect and manage store-induced instruction incoherencies in a present day microprocessor. These and other deficiencies and limitations of the prior art are overcome by the present invention, which will now be discussed with reference to FIGS. 3-10.

Figure 3:
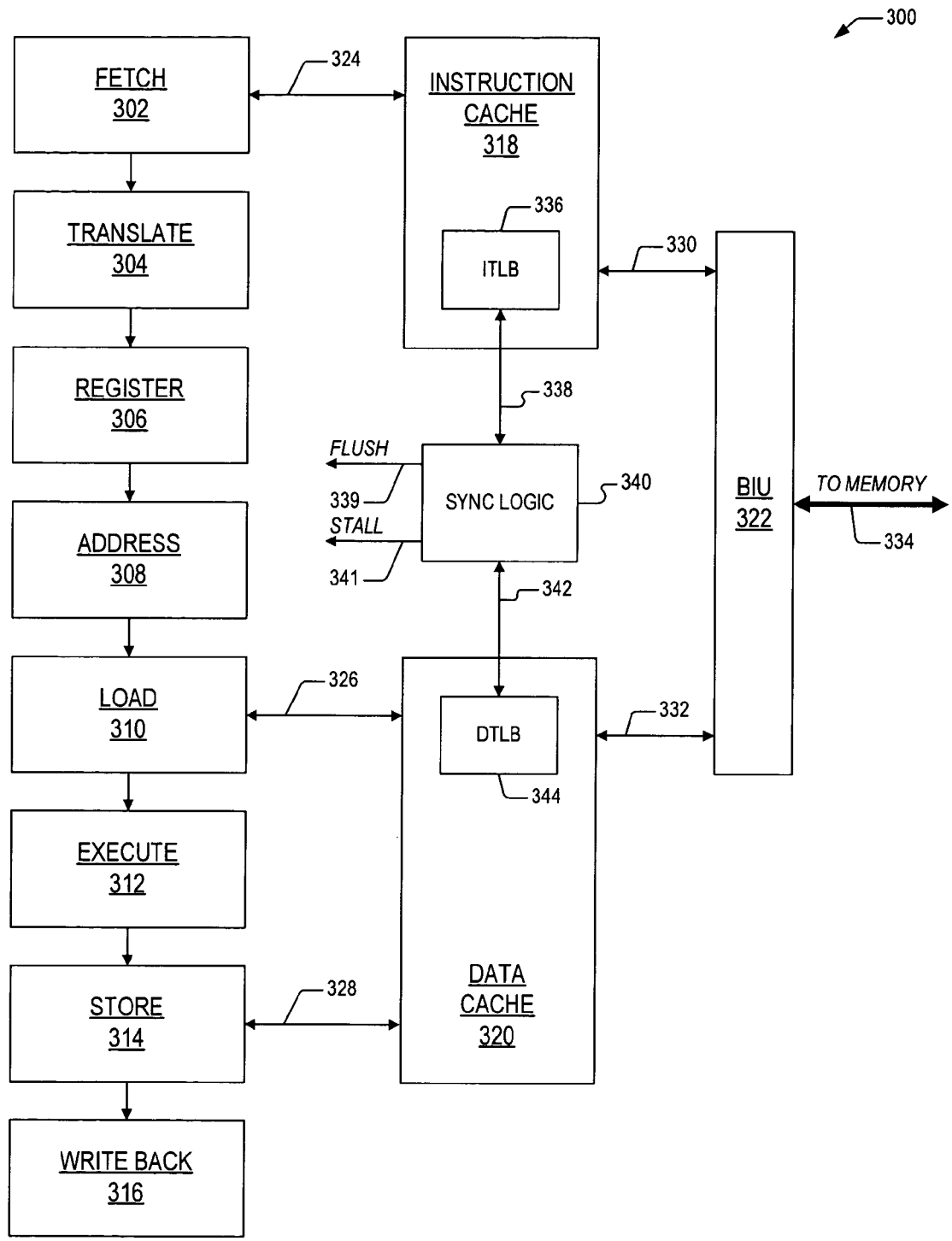
FIG. 3 is a block diagram featuring a microprocessor according to the present invention for ensuring the coherency of pipeline instructions in the presence of pending or concurrently executed store operations.

Now turning to FIG. 3, a block diagram is presented featuring a microprocessor 300 according to the present invention for ensuring the coherency of pipeline instructions in the presence of pending or concurrently executed store operations. Like the microprocessor 100 of FIG. 1, the microprocessor 300 according to the present invention has fetch stage logic 302 that is coupled to translate stage logic 304. The translate stage logic 304 is coupled to register stage logic 306. The register stage logic 306 is coupled to address stage logic 308. The address stage logic 308 is coupled to load stage logic 310. The load stage logic 310 is coupled to execute stage logic 312. The execute stage logic 312 is coupled to store stage logic 314. The store stage logic 314 is coupled to write back stage logic 316. The microprocessor 300 also has an instruction cache 318 that is coupled to the fetch stage logic 302 via a fetch bus 324. In addition, the microprocessor 300 has a data cache 320 that is coupled to the load stage logic 310 via a load bus 326 and that is coupled to the store stage logic 314 via a store bus 328. The instruction cache 318 and the data cache 320 are coupled to a bus interface unit 322 via buses 330 and 332, respectively. The bus interface unit 322 interfaces to system memory (not shown) via a memory bus 334.

In addition, the instruction cache 318 includes an instruction translation lookaside buffer (ITLB) 336 that is coupled to sync logic 340 via bus 338. The data cache 320 has a data translation lookaside buffer (DTLB) 344 that is coupled to the sync logic 340 via bus 342. The sync logic outputs a flush signal 339 and a stall signal 341 to pipeline synchronization logic (not shown) substantially similar in operation to the pipeline synchronization logic 206 of FIG. 2.

In operation, the fetch stage logic 302 fetches macro instructions from system memory for execution by the microprocessor 300. The instruction cache 318 anticipates which areas of memory are going to be accessed for instruction fetches and preemptively caches those areas therein so that the fetch stage logic 302 can rapidly access them in the instruction cache 318 rather than having to access them via the bus interface unit 322 over the memory bus 334. Fetched macro instructions are provided to the translate state logic 304 which translates the macro instructions into associated sequences of micro instructions for execution by subsequent stages 306, 308, 310, 312, 314, 316 of the microprocessor 300. Each micro instruction within a given associated sequence of micro instructions directs logic within subsequent pipeline stages 306, 308, 310, 312, 314, 316 to perform sub-operations that are required to accomplish an architectural operation that is prescribed by a corresponding fetched macro instruction. Translated micro instructions are provided to the register stage logic 306. Operands that will be employed in sub-operations in subsequent stages 308, 310, 312, 314, 316 are accessed from registers (not shown) within the register stage logic 306. The address stage logic 308 employs operands provided via the register stage 306 or via a provided micro instruction to generate virtual addresses of memory locations from which operands needed for particular sub-operations will be retrieved or to which the results of particular sub-operations will be stored. The generated addresses for data retrieval sub-operations are provided to the load stage logic 310, which retrieves operands from memory via the data cache 120. The data cache 120 anticipates which areas of system memory are going to be accessed and to preemptively caches those areas therein so that the load stage logic 310 can rapidly access operands via the data cache 320 rather than having to access them via the bus interface unit 322 over the memory bus 334.

The execution stage logic 312 executes the sub-operations prescribed by micro instructions using provided operands (if required) as passed down from preceding pipeline stages 302, 304, 306, 308, 310. Results of the sub-operations performed by the execution stage logic 312 are provided to the store stage logic 314 if those results are to be written to system memory. The store stage logic 114 performs the sub-operations that are required to store results to memory locations. The store stage logic 314 is also coupled to the data cache 320 and optimally executes store operations to cached locations within the data cache 320 as opposed to having to write result data through to the memory bus 334. Execution results that are designated for storage in architectural registers are provided to the write back stage logic 316. The write back stage logic 316 writes the results into the architectural registers. Hence, macro instructions are fetched from memory and are translated into associated micro instructions. The associated micro instructions are sequentially routed through each of the subsequent logic stages 306, 308, 310, 312, 314, 316 in synchronization with a pipeline clock signal (not shown) so that specified sub-operations can be concurrently executed in a manner substantially similar to operations performed on an assembly line.

The block diagram of FIG. 3 is provided to teach necessary elements of the present invention and thus, much of the other logic common to a present day microprocessor 300 has been omitted from the block diagram for clarity purposes. One skilled in the art will appreciate, however, that a present day microprocessor 300 comprises many stages and logic elements according to specific implementation, some of which have been aggregated herein for clarity purposes. For instance, in one embodiment of the present invention, the load logic 310 could embody a cache interface stage followed by a cache line alignment stage. Furthermore, one skilled in the art will appreciate that other embodiments of the present invention within a present day microprocessor 300 may embody multiple parallel execution units within the execute stage logic 112 such as an integer unit, a floating point unit, and single instruction-multiple data unit, or a combination of these units or other types of special-purpose execution units.

To detect and manage instruction coherencies within the pipeline stages 302, 304, 306, 308, 310, 312, 314, 316 the microprocessor 300 according to the present invention, the present inventors have provided logic within each of the two translation lookaside buffers 336, 344 to indicate whether an area of memory may be freely accessed without checking for coherency in the pipeline. Although not described with reference to FIGS. 1 and 2, one skilled in the art will appreciate that present day microprocessors 300 employ TLBs 336, 344 within their caches 318, 320 to cache physical addresses and memory attributes (e.g., read-only, write-combining) corresponding to pages of physical memory to which frequently employed virtual addresses are mapped. For example, one skilled in the art would expect to find an entry within the ITLB 336 that corresponds to a virtual address of a next instruction provided by the fetch logic 302. If this virtual address "hits" in the ITLB 336, then all of the address translation table lookups (e.g., page directory, page table, etc.) that are necessary to convert a virtual address to a physical address in a present day microprocessor 300 do not have to be performed; the physical address of memory page within which the next instruction resides is already cached in the ITLB 336 along with its memory attributes. However, if the virtual address "misses" the ITLB 336, then the address translation table lookups must be performed in order to generate the physical address of the next instruction. This physical address is employed to index into the instruction cache 318 to determine whether or not the next instruction is contained therein. Likewise, translated addresses and memory attributes associated with load and store operations are cached within the DTLB 344.

It is a feature of the present invention to provide additional fields within each of the entries within both the ITLB 336 and the DTLB 344 that indicate whether a part of a memory page corresponding to each of the entries can or cannot be freely accessed without checking for coherency of instructions within that part of the memory page. In one embodiment, the part of the memory page is one-quarter of a page. For a microprocessor that provides for virtual addressing of memory pages 4 kilobytes (kB) in size, one embodiment of the present invention would indicate that a 1 kB portion of a corresponding memory page can or cannot be freely accessed without checking for coherency of instructions.

In a microprocessor architecture that allows for selective enablement of virtual addressing, the preferred embodiment of the present invention requires that TLB lookups be performed to ensure instruction coherency even when virtual addressing is disabled.

To detect pending or concurrently executing store operations upon an instruction fetch, when the fetch stage logic 302 goes to the instruction cache 318 to fetch a next instruction, the next instruction pointer (i.e., the virtual address of a memory location containing the next instruction to be fetched) is provided to the ITLB 336 within the instruction cache 318 via bus 324. If the next instruction pointer hits within the ITLB 336, then the additional fields are evaluated to determine whether a part of a memory page corresponding to the next instruction can be freely accessed. If the evaluation indicates that the part of the memory page can be freely accessed, then the next instruction is fetched without checking for instruction coherency in the pipeline. If the next instruction pointer misses, or if the fields indicate that the part of the page cannot be freely accessed, then the next instruction pointer is provided to the sync logic 340 via bus 338.

Responsive to provision of the next instruction pointer, the sync logic 340 directs the DTLB 344 via bus 342 to check for coherency of instructions within the part of the memory page as indicated by a corresponding entry within the DTLB 344. If fields within the DTLB entry indicate that instructions are not coherent (i.e., a store is pending or concurrently being executed to the part of the memory page within which the next instruction is stored), then the sync logic 340 asserts the stall signal 341, thus directing the microprocessor to stall fetching of the next instruction until subsequent stages 304, 306, 308, 310, 312, 314, 316 of the pipeline has completed execution of all preceding instructions (i.e., until the pipeline is idle and all stores have been posted).

To detect the presence of incoherent instructions in the pipeline when a store micro instruction is executed by the store stage logic 314, the store micro instruction, which includes a destination virtual address for a prescribed store operation, is provided to the DTLB 344 within the data cache 320 via bus 328. If the destination virtual address hits within the DTLB 344, then the additional fields within the selected DTLB entry are evaluated to determine whether a part of a memory page corresponding to the destination virtual address can be freely accessed without checking for coherency of instructions within the part of the memory page. If the evaluation indicates that the part of the memory page can be freely accessed, then the store operation is posted to the data cache 320 without further checks. If the destination (or, target) virtual address misses, or if the fields indicate that the part of the page cannot be freely accessed, then the target virtual address is provided to the sync logic 340 via bus 342.

Responsive to provision of the store target address, the sync logic 340 directs the ITLB 336 via bus 338 to check for coherency of instructions within the part of the memory page as indicated by a corresponding entry within the ITLB 336. If fields within the ITLB entry indicate that instructions are not coherent (i.e., one or more instructions have been retrieved from the part of the memory page and are currently being executed within one or more preceding stages of the pipeline), then the sync logic 340 asserts the flush signal 339, thus directing the microprocessor to flush the preceding pipeline stages and to stall fetching of instructions until the pipeline is idle and all stores have been posted.

The present invention enables a designer to exploit existing TLB logic within a pipeline microprocessor to incorporate the additional function of indicating part-page instruction coherency based upon instruction fetches from and stores posted to portions of memory pages. Part-page ownership fields are added to existing TLB entries that indicate, with part-page granularity, whether a corresponding part of a memory page can be freely accessed. When a store is posted to a part of a memory page, its corresponding ownership field is set to indicate that the DTLB "owns" the part of the memory page. When an instruction is fetched from a part of a memory page, its corresponding ownership field is set to indicate that the ITLB owns the part of the memory page. The sync logic 340 manages the ownership fields within both the ITLB 336 and DTLB 344. In one embodiment, indications of ownership for the same part of a memory page are mutually exclusive. That is, if entries corresponding to particular virtual address reside within both the DTLB 344 and the ITLB 336, only one of the two entries can indicate that it owns the part of the memory page corresponding to the virtual address. In an alternative embodiment, both entries are allowed to own a part of a memory page, but coherency is determined based upon indications whether the page is "dirty" or not, as will be subsequently described below.

Figure 4:
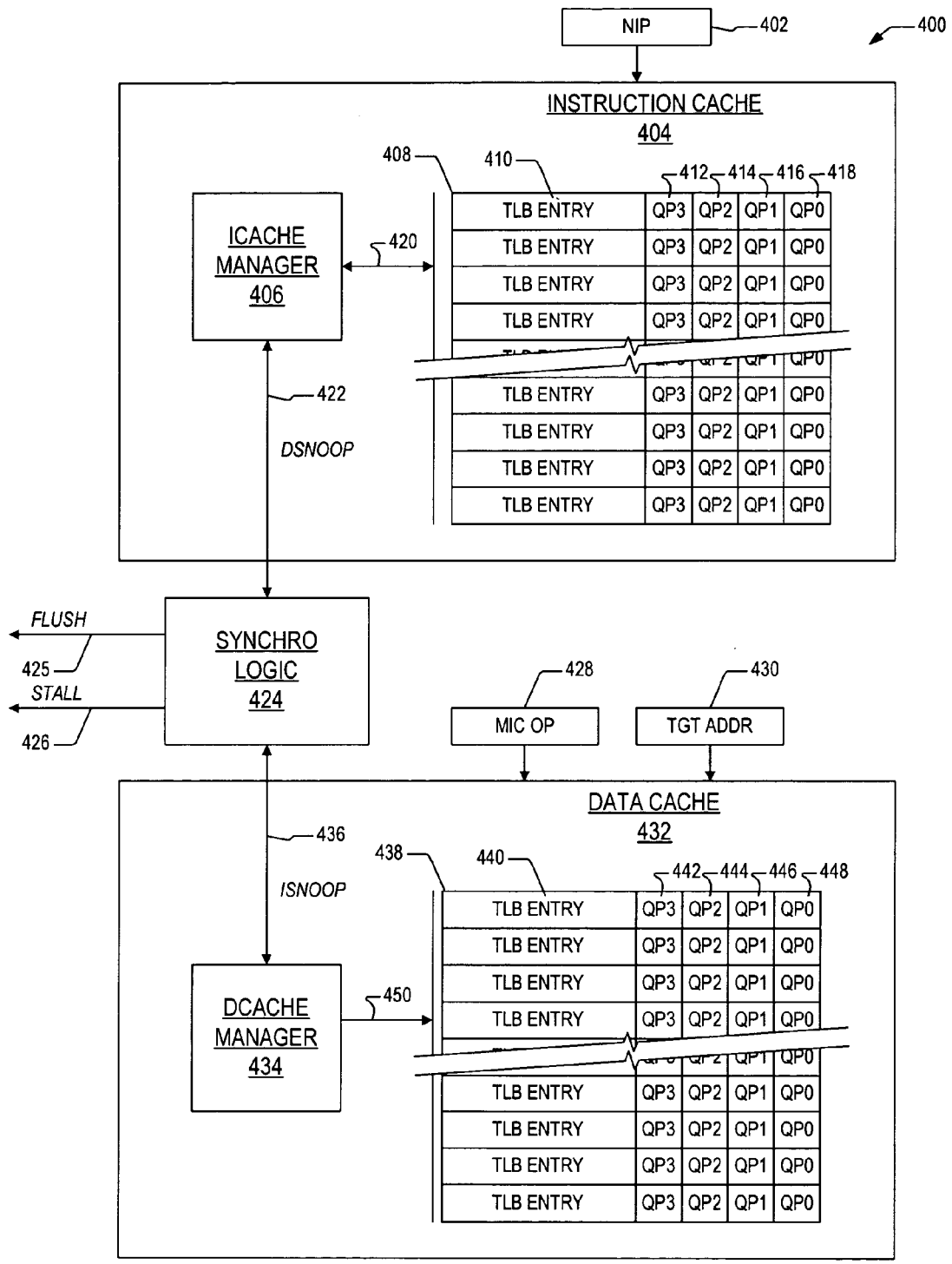
FIG. 4 is a block diagram showing details of the interrelationship between an instruction cache and a data cache within the microprocessor of FIG. 3.

Now referring to FIG. 4, a block diagram 400 is presented showing details of the interrelationship between an instruction cache 318 and a data cache 320 within the microprocessor of FIG. 3. The block diagram 400 depicts a next instruction pointer 402 that is provided from fetch stage logic (not shown). The next instruction pointer 402 is provided to an instruction cache 404 according to the present invention. The instruction cache 404 is coupled to synchro logic 424 via a DSNOOP bus 422. The synchro logic 424 is coupled to a data cache 432 according to the present invention via an ISNOOP bus 436. The instruction cache 404 includes instruction cache management logic (ICACHE MANAGER) 406 that accesses a instruction translation lookaside buffer (ITLB) 408 via bus 420. The ITLB 408 includes a plurality of entries 410 as has been described above. In one embodiment of the present invention, each ITLB entry 410 also has a plurality of part-page ownership fields 412, 414, 416, 418 whose contents indicate whether a corresponding part of a memory page associated with the TLB entry 410 can be freely accessed for an instruction fetch without checking for coherency of instructions in the pipeline. In the block diagram 400, four quarter-page ownership fields 412, 414, 416, 418 are depicted for TLB entry 410, thus enabling store-induced instruction coherency management to be accomplished with quarter-page granularity. Alternative embodiments contemplate single-page granularity, half-page granularity, eighth-page granularity, $16^{th}$-page granularity, and $32^{nd}$-page granularity by deleting or adding ownership fields to each TLB entry 410 accordingly.

The block diagram 400 also depicts a micro operation field 428 of a micro instruction and an associated target address field 430 of the micro instruction that are provided from store stage logic (not shown) to a data cache 432 according to the present invention. The data cache 404 includes data cache management logic (DCACHE MANAGER) 434 that accesses a data translation lookaside buffer (DTLB) 438 via bus 450. The DTLB 438 includes a plurality of entries 440 as has been described above. In one embodiment of the present invention, each DTLB entry 438 also has a plurality of part-page ownership fields 442, 444, 446, 448 whose contents indicate whether a corresponding part of a memory page associated with the TLB entry 440 can be freely accessed for store operation without checking for coherency of instructions in the pipeline. In the block diagram 400, four quarter-page ownership fields 442, 444, 446, 448 are depicted for TLB entry 410, thus enabling store-induced instruction coherency management to be accomplished with quarter-page granularity. Alternative embodiments contemplate single-page granularity, half-page granularity, eighth-page granularity, $16^{th}$-page granularity, and $32^{nd}$-page granularity by deleting or adding ownership fields to each TLB entry 440 accordingly.

In operation, the state of two corresponding part-page ownership bits 412, 442; 414, 444; 416, 446; 418, 448 between two corresponding ITLB and DTLB entries 410, 440 are mutually exclusive. This means that either the instruction cache 404 or the data cache 432 can own a part of a virtual memory page, but not both. When a NIP 402 is provided to the instruction cache 404 for an instruction fetch, the instruction cache manager 406 accesses its corresponding TLB entry 410 and ownership bit 412, 414, 416, or 418. (The particular part-page ownership bit 412, 414, 416, 418 that is accessed is a function of the value of lower-order address bits of the NIP 402 that indicate within which part of the memory page a next instruction is stored.) If the NIP 402 hits within the ITLB 408, and if its part page ownership bit 412, 414, 416, or 418 indicates that the instruction cache 404 owns the part of the memory page, then the instruction is fetched without further checking for coherency. If the NIP 402 misses, or if it hits and instruction cache ownership is not indicated, then the NIP 402 is provided to the synchro logic 424 over the DSNOOP bus 422. In turn, the synchro logic 424 provides the NIP 402 to the data cache manager 434 over the ISNOOP bus 436 to snoop the DTLB 438 for part page ownership. Within the data cache 432, the data cache manager 434 accesses the TLB entry 440 and ownership bit 442, 444, 446, or 448 corresponding to the supplied NIP 402. (As in the ITLB 408, the particular part-page ownership bit 442, 444, 446, 448 that is accessed within the DTLB 438 is a function of the value of lower-order address bits of the NIP 402 that indicate within which part of the memory page a next instruction is stored.) If the NIP 402 hits within the DTLB 438, and if its part page ownership bit 442, 444, 446, or 448 indicates that the data cache 432 owns the part of the memory page, then the synchro logic 424 directs the microprocessor to stall fetching instructions and to wait until its pipeline is idle and stores have been completed by asserting signal STALL 426. Additionally, the synchro logic 424 directs the data cache manager 434 via bus 436 to release ownership of the part-page and to indicate so by changing the value of the corresponding ownership field 442, 444, 446, or 448. Also, the synchro logic 424 directs the instruction cache manager 406 via bus 422 to establish ownership of the part-page and to indicate so by changing the value of the corresponding ownership field 412, 414, 416, or 418. In one embodiment of the present invention, if a NIP 402 misses in the ITLB 408 and hits in the DTLB 438, regardless of whether DTLB ownership is indicated or not, the DTLB entry 440 corresponding to the NIP 402 is copied to its counterpart entry 410 in the ITLB 408 through the synchro logic 424 via the snoop buses 436, 422 so that an address translation lookup sequence (i.e., page table walk) is avoided.

When a target address 430 corresponding to a store micro operation 428 is provided to the data cache 432, the data cache manager 434 accesses its corresponding TLB entry 440 and ownership bit 442, 444, 446, or 448. (The particular part-page ownership bit 412, 414, 416, 418 that is accessed is a function of the value of lower-order address bits of the target address 430 that indicate within which part of the memory page data is to be stored.) If the target address 430 hits within the DTLB 438, and if its part page ownership bit 442, 444, 446, or 448 indicates that the data cache 404 owns the part of the memory page, then the store is posted without further checking for coherency. If the target address 430 misses, or if it hits and data cache ownership is not indicated, then the target address 430 is provided to the synchro logic 424 over the ISNOOP bus 436. In turn, the synchro logic 424 provides the target address 430 to the instruction cache manager 406 over the DSNOOP bus 422 to snoop the ITLB 408 for part page ownership. Within the instruction cache 404, the instruction cache manager 406 accesses the TLB entry 410 and ownership bit 412, 414, 416, or 418 corresponding to the supplied target address 430. (As in the DTLB 438, the particular part-page ownership bit 412, 414, 416, 418 that is accessed within the ITLB 408 is a function of the value of lower-order address bits of the target address 430 that indicate to which part of the memory page a pending store is to be posted.) If the target address 430 hits within the ITLB 408, and if its part page ownership bit 412, 414, 416, or 418 indicates that the instruction cache 404 owns the part of the memory page, then the synchro logic 424 directs the microprocessor to flush preceding instructions from its pipeline stages and to stall fetching instructions until its pipeline is idle and stores have been completed by asserting signal FLUSH 425. Additionally, the synchro logic 424 directs the instruction cache manager 406 via bus 422 to release ownership of the part-page and to indicate so by changing the value of the corresponding ownership field 412, 414, 416, or 418. Also, the synchro logic 424 directs the data cache manager 434 via bus 436 to establish ownership of the part-page and to indicate so by changing the value of the corresponding ownership field 442, 444, 446, or 448. In one embodiment of the present invention, if a target address 430 misses in the DTLB 438 and hits in the ITLB 408, regardless of whether ITLB ownership is indicated or not, the ITLB entry 410 corresponding to the target address 430 is copied to its counterpart entry 440 in the DTLB 438 through the synchro logic 424 via the snoop buses 436, 422 so that an address translation lookup sequence (i.e., page table walk) is avoided.

Now referring to FIG. 5, a block diagram is presented illustrating cache management logic 500 according to the present invention. The cache management logic 500 reflects the configuration of either the instruction cache manager 406 or the data cache manager 434 as discussed above with reference to FIG. 4. The cache management logic 500 includes TLB access logic 502 that couples to snoop logic 504 via bus entryout 512 and to snarf logic 506 via bus entryin 514. The snoop and snarf logic 504, 506 are coupled to sync logic (not shown) according to the present invention via a snoop bus 516. A virtual address (corresponding to either a next instruction pointer or a store destination address) is provided to the TLB access logic 502 via bus 510. For purposes of illustration, a 32-bit address bus 510 is depicted, however, it is noted that the present invention comprehends other virtual address spaces as well to include 16-bit, 64-bit, 128-bit, and 256-bit addressing schemes. The bus 510 is also routed to the snoop logic 504. Upper bits of the virtual address ADDR 31:12 are provided to a translation lookaside buffer according to the present invention (not shown) for retrieval of a corresponding TLB entry via bus ENTRY DATA.

Operationally, when a virtual address is provided to the cache management logic 500, the TLB access logic 502 routes the upper bits ADDR 31:12 to the TLB to determine if an entry exists in the TLB (i.e., a hit). If so, then the entry and its ownership bits are copied to an entry buffer 508 within the access logic 502. For illustration purposes, the block diagram shows address bits ADDR 31:12 being submitted to the TLB, thus indicating a 4-KB virtual page size, however, the present inventors point out that the present invention applies as well to other present day page sizes to include 1-KB, 8-KB, 16-KB, etc. Using lower-order bits of the virtual address (bits 11:10 in this example), the TLB access logic 502 evaluates a corresponding ownership field QP3, QP2, QP1, or QP0 to determine if an associated part of an virtual memory page can be freely accessed without snooping for ownership within a counterpart TLB. If ownership is not indicated, or if the virtual address misses altogether, then the snoop logic 504 routes the virtual address to the sync logic (not shown) for snooping of the other TLB via the snoop bus 516. If the state of the other TLB entry indicates that its entry is to be copied to the TLB access logic, then the entry is provide via the snoop bus 516, through the snarf logic 506, and is provided to the TLB access logic via bus ENTRYIN 514. If a snoop is initiated to the cache management logic from its counterpart via the snoop bus, then the snarf logic 506 routes the provided virtual address to the TLB access logic 502 via the entryin bus 514. Upon retrieval and examination of the corresponding TLB entry, if it is indicated that the entry is to be copied to the counterpart TLB, then the TLB entry is provided via bus entryout 512, through the snoop logic 504, to the snoop bus 516. The TLB access logic 502 changes the state of the ownership fields QP3-QP0 as directed by the sync logic.

Turning to FIG. 6, a table 600 is presented detailing synchronization actions that are performed responsive to a pending store operation according to the present invention to ensure the coherency of instructions within a pipeline. As has been previously discussed with reference to FIGS. 3-5, if a target address supplied to a DTLB according to the present invention hits within the DTLB, and if the DTLB owns the part of the memory page to which the store is pending, then the store is completed without having to check for instruction coherency within the pipeline. If the DTLB hits but does not have ownership of the part page, then the ITLB is snooped. If the ITLB hits and has ownership of the part page, then the pipeline is flushed and stalled until the store is completed and the pipeline is idle. The ownership bit within the ITLB is set to indicate that the ITLB does not own the part page anymore and the corresponding ownership bit within the DTLB is set to indicate that the DTLB now owns the part page. If the ITLB snoop hits but ownership is not indicated, the DTLB indicates part-page ownership and the store completes. If the DTLB misses, an ITLB snoop is initiated. Upon an ITLB snoop hit, its TLB entry is copied to the DTLB. If the ITLB indicates ownership of the part page, then the pipeline is flushed and stalled until it is idle. The ownership bit within the ITLB is set to indicate that the ITLB does not own the part page anymore and the corresponding ownership bit within the DTLB is set to indicate that the DTLB now owns the part page. If the ITLB entry does not indicate ownership, then the DTLB entry is set to indicate part-page ownership and the store completes using the physical address and attribute information that was copied from the ITLB.

Now turning to FIG. 7, a table 700 is presented detailing synchronization actions that are performed prior to fetching a next instruction according to the present invention to ensure the coherency of instructions within a pipeline. If a virtual address for the next instruction that is supplied to an ITLB according to the present invention hits within the ITLB, and if the ITLB owns the part of the memory page within which the next instruction is stored, then the instruction fetch is completed without having to check for instruction coherency within the pipeline. If the ITLB hits but does not have ownership of the part page, then the DTLB is snooped. If the DTLB hits and has ownership of the part page, then the pipeline is stalled until the store is completed and the pipeline is idle. When the pipeline is idle, the next instruction is fetched. The ownership bit within the DTLB is set to indicate that the DTLB does not own the part page anymore and the corresponding ownership bit within the ITLB is set to indicate that the ITLB now owns the part page. If the DTLB snoop hits but ownership is not indicated, the ITLB indicates part-page ownership and the instruction is fetched. If the ITLB misses, a DTLB snoop is initiated. Upon a DTLB snoop hit, its TLB entry is copied to the ITLB. If the DTLB indicates ownership of the part page, then the pipeline is stalled until it is idle. When the pipeline is idle, then the next instruction is fetched. The ownership bit within the DTLB is set to indicate that the DTLB does not own the part page anymore and the corresponding ownership bit within the ITLB is set to indicate that the ITLB now owns the part page. If the DTLB entry does not indicate ownership, then the ITLB entry is set to indicate part-page ownership and the next instruction is fetched using the physical address and attribute information that was copied from the DTLB.

Figure 8:
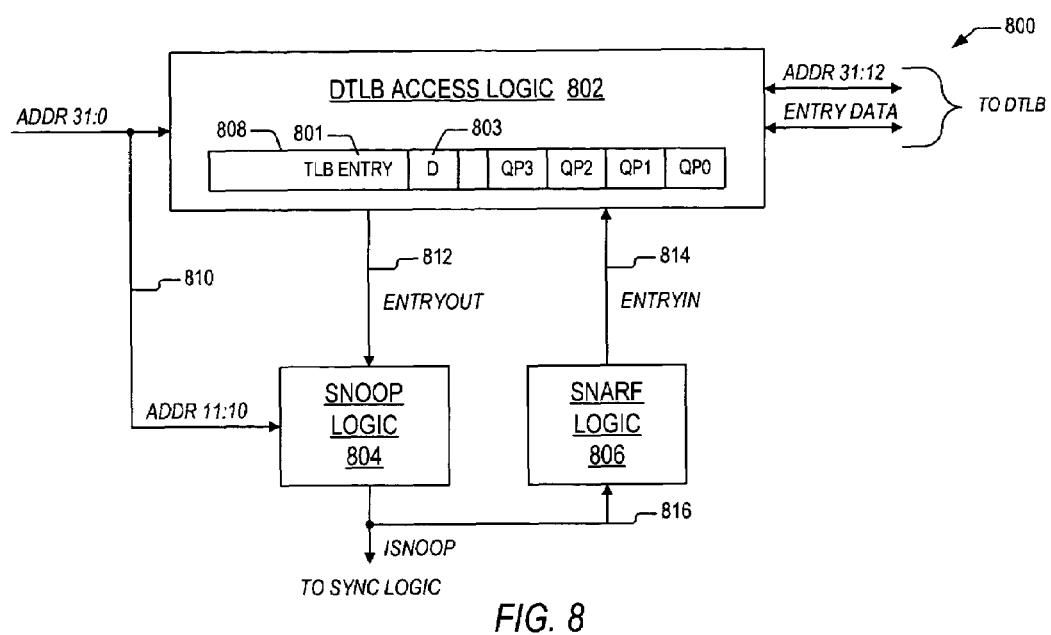
FIG. 8 is a block diagram illustrating an alternative embodiment of cache management logic according to the present invention.

Now referring to FIG. 8, a block diagram is presented illustrating an alternative embodiment of cache management logic 800 according to the present invention. The alterative embodiment of the cache management logic 800 includes elements that operate in a manner substantially similar to like numbered elements of the cache management logic 500 discussed with reference to FIG. 5, where the hundreds digit is replaced by an "8". In contrast, however, to the cache management logic 500 of FIG. 5, the alternative embodiment of the cache management logic 800 does not require the state of corresponding part page ownership fields QP3-QP0 between an instruction cache and data cache according to the present invention to be mutually exclusive. As alluded to above, both an instruction cache and a data cache can indicate ownership of a part of a memory page corresponding to a provided virtual address. This allows for read accesses to a data cache to occur without affecting instruction fetching throughput. In the case of a read access to a data cache, the DTLB access logic 802 establishes ownership of the part of the corresponding memory page, but synchronization logic does not require that the instruction cache release ownership. Hence, if an instruction fetch occurs to that part of the corresponding memory page, the fetch can be completed without snooping the DTLB. Since the instruction and data cache can both own a particular part of a memory page, the present invention requires that the DTLB access logic 802 consider the state of a dirty bit 803 within the accessed TLB entry field 801 to determine, on a DTLB snoop from the instruction cache, if a store is pending or has been posted to the part of the memory page, or if only read operations have been posted to the part of the page, thus allowing instruction fetching to continue without stalling the pipeline. One skilled in the art will appreciate that the dirty bit 803 is one of the MESI cache line state indicators prevalently employed to indicate that the contents of a cache entry have been modified within the cache, but have not been posted to memory. Although the dirty bit 803 is shown as part of a TLB entry 801, one skilled in the art will also appreciate that dirty bits are as well assigned at the level of storage within a cache, typically at the cache line level. FIGS. 9 and 10 discuss synchronization of the pipeline in more detail according to the alternative embodiment of cache management logic 800.

Referring to FIG. 9, a table 900 is provided detailing synchronization actions that are performed responsive to a pending store operation according to the alternative embodiment 800 of FIG. 8 to ensure the coherency of instructions within a pipeline. According to the alternative embodiment 800, if a target address supplied to a DTLB according to the present invention hits within the DTLB, and if the DTLB owns the part of the memory page to which the store is pending, and if the memory page is dirty (or the particular cache line associated with the target address is dirty), then the store is completed without having to check for instruction coherency within the pipeline. If target address hits within the DTLB, and if the DTLB owns the part of the memory page to which the store is pending, and if the memory page (or corresponding cache line) is not dirty, then the ITLB must be snooped. Upon an ITLB snoop hit with ownership, the pipeline must be flushed and instruction fetching stalled until the pipeline is idle and the store has posted. In addition, the ownership bit within the ITLB is set to indicate that the ITLB does not own the part page anymore. Upon an ITLB snoop hit without ownership, the store is posted. If the DTLB hits but does not have ownership of the part page, then the ITLB is snooped. If the ITLB hits and has ownership of the part page, then the pipeline is flushed and stalled until the store is completed and the pipeline is idle. In addition, the ownership bit within the ITLB is set to indicate that the ITLB does not own the part page anymore and the corresponding ownership bit within the DTLB is set to indicate that the DTLB now owns the part page. If the ITLB snoop hits but ownership is not indicated, the DTLB indicates part-page ownership and the store completes. If the DTLB misses, an ITLB snoop is initiated. Upon an ITLB snoop hit, its TLB entry is copied to the DTLB. If the ITLB indicates ownership of the part page, then the pipeline is flushed and stalled until it is idle, including posting the store. In addition, the ownership bit within the ITLB is set to indicate that the ITLB does not own the part page anymore and the corresponding ownership bit within the DTLB is set to indicate that the DTLB now owns the part page. If the ITLB entry does not indicate ownership, then the DTLB entry is set to indicate part-page ownership and the store completes using the physical address and attribute information that was copied from the ITLB.

FIG. 10 is a table showing synchronization actions that are performed prior to fetching a next instruction according to the alternative embodiment 800 of FIG. 8 to ensure the coherency of instructions within a pipeline. If a virtual address for the next instruction that is supplied to an ITLB according to the present invention hits within the ITLB, and if the ITLB owns the part of the memory page within which the next instruction is stored, then the instruction fetch is completed without having to check for instruction coherency within the pipeline. If the ITLB hits but does not have ownership of the part page, then the DTLB is snooped. If the DTLB snoop hits and the corresponding memory page (or cache line, if cache line granularity is provided for MESI state) is dirty, then the pipeline is stalled until the store is completed and the pipeline is idle. When the pipeline is idle, the next instruction is fetched. If the DTLB snoop hits but the corresponding memory page (or cache line) is not dirty, the ITLB indicates part-page ownership and the instruction is fetched. If the ITLB misses, a DTLB snoop is initiated. Upon a DTLB snoop hit, its TLB entry is copied to the ITLB. If the snoop to the data cache indicates that the part (i.e., part page or cache line) of the corresponding memory page is dirty, then the pipeline is stalled until it is idle. When the pipeline is idle, then the next instruction is fetched. If the data cache snoop does not indicate that the part-page (or cache line) is dirty, then the ITLB entry is set to indicate part-page ownership and the next instruction is fetched using the physical address and attribute information that was copied from the DTLB.

Although the present invention and its objects, features, and advantages have been described in detail, other embodiments are encompassed by the invention as well. For example, the present invention has been discussed in the context of a separate instruction cache and data cache for purposes of illustration. The present inventors, however, note that the invention described herein comprehends combined cache architectures as well. TLB entries can be shared and fields appended to each to indicate ownership in an instruction path or a data path.

In addition, the present invention has been described in terms of particular stages (fetch, translate, etc.) of a pipeline. These names and aggregations are provided herein to provide clarity of teaching rather than to suggest a specific pipeline architecture. It is noted that the present invention applies to any present day pipelining architecture of any number of pipeline stages, including a subset of which execute micro instructions out-of-order.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus in a pipeline microprocessor, for ensuring coherency of instructions within stages of the pipeline microprocessor, the apparatus comprising:

instruction cache management logic, configured to receive an address corresponding to a next instruction to be fetched, and configured to detect that a part of a memory page corresponding to said next instruction to be fetched cannot be freely accessed without checking for coherency of the instructions within said part of said memory page and, upon detection, configured to provide said address, wherein said instruction cache management logic evaluates an instruction translation lookaside buffer (ITLB) entry corresponding to said address to detect that said part cannot be freely accessed; and synchronization logic, configured to receive said address from said instruction cache management logic, and configured to direct data cache management logic to check for coherency of the instructions within said part of said memory page, and, if the instructions are not coherent within said part of said memory page, said synchronization logic is configured to direct the pipeline microprocessor to stall a fetch of said next instruction to be fetched until the stages of the pipeline microprocessor have executed all preceding instructions, wherein said data cache management logic evaluates a data translation lookaside buffer (DTLB) entry corresponding to said address to detect that the instructions are not coherent within said part of said memory page;

wherein if said instruction cache management logic detects that said part cannot be freely accessed, regardless of whether said instructions are coherent or not, said DTLB entry contents are copied into said ITLB entry by said synchronization logic so that an address translation lookup sequence is avoided.

2. The apparatus as recited in claim 1, wherein said ITLB entry and said DTLB entry both correspond to said memory page.

3. The apparatus as recited in claim 2, wherein said ITLB entry and said DTLB entry each comprises a plurality of part-page ownership bits.

4. The apparatus as recited in claim 3, wherein said plurality of part-page ownership bits comprise four part-page ownership bits each in said ITLB and DTLB entries, and wherein said part comprises one-quarter of said memory page.

5. The apparatus as recited in claim 3, wherein a first one of said plurality of part-page ownership bits in said ITLB entry and a second one of said plurality of part-page ownership bits in said DTLB entry both correspond to said part of said memory page.

6. The apparatus as recited in claim 5, wherein remaining ones of said plurality of part-page ownership bits correspond to remaining parts of said memory page.

7. The apparatus as recited in claim 5, wherein said part can be freely accessed if first said one of said plurality of part-page ownership bits is set in said ITLB entry.

8. The apparatus as recited in claim 5, wherein said part cannot be freely accessed if said first one of said plurality of part-page ownership bits is not set in said ITLB entry.

9. The apparatus as recited in claim 5, wherein the instructions are not coherent within said part if said second one of said plurality of part-page ownership bits is set.

10. The apparatus as recited in claim 5, wherein the instructions are coherent within said part if said one of said plurality of part-page ownership bits is not set.

11. A method in a pipeline microprocessor, for ensuring coherency of instructions within stages of the pipeline microprocessor, the method comprising:

within an instruction cache, detecting that a part of a memory page corresponding to a next instruction to be fetched cannot be freely accessed without checking for coherency of the instructions within the part of the memory page, wherein said detecting comprises:

evaluating an instruction translation lookaside buffer (ITLB) entry corresponding to an address for the next instruction;

directing logic within a data cache to check for coherency of the instructions within the part of the memory page, wherein said directing comprises evaluating a data translation lookaside buffer (DTLB) entry corresponding to the address for the next instruction;

if the instructions are not coherent, stalling a fetch of the next instruction from the instruction cache until the stages of the pipeline microprocessor have executed all preceding instructions; and regardless of whether said instructions are coherent or not, if the part cannot be freely accessed, copying the DTLB entry contents into the ITLB entry, whereby an address translation lookup sequence is avoided.

12. The method as recited in claim 11, wherein the ITLB entry and the DTLB entry both correspond to the memory page.

13. The method as recited in claim 12, wherein the ITLB entry and the DTLB entry each comprises a plurality of part-page ownership bits.

14. The method as recited in claim 13, wherein the plurality of part-page ownership bits comprise four part-page ownership bits each in the ITLB and DTLB entries, and wherein the part comprises one-quarter of the memory page.

15. The method as recited in claim 13, wherein a first one of the plurality of part-page ownership bits in the ITLB and a second one of the plurality of part-page ownership bits in the DTLB both correspond to the part of the memory page.

16. The method as recited in claim 15, wherein the instructions are not coherent within the part if the second one of the plurality of part-page ownership bits is set.

17. The method as recited in claim 15, wherein remaining ones of the plurality of part-page ownership bits correspond to remaining parts of the memory page.

18. The method as recited in claim 17, wherein the part of said memory page can be freely accessed if the first one of the plurality of part-page ownership bits is set.

19. The method as recited in claim 17, wherein the part of the memory page cannot be freely accessed if the first one of the plurality of part-page ownership bits is not set.

* * * * *